(12) United States Patent
Maruyama et al.

(10) Patent No.: US 8,225,355 B2
(45) Date of Patent: Jul. 17, 2012

(54) PROGRAM SEARCH APPARATUS AND PROGRAM SEARCH METHOD FOR SAME

(75) Inventors: Kazuna Maruyama, Tokyo (JP); Kazuhiro Matsubayashi, Yokohama (JP); Hirofumi Urabe, Kawasaki (JP); Koji Mito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 576 days.

(21) Appl. No.: 11/785,268

(22) Filed: Apr. 17, 2007

(65) Prior Publication Data
US 2007/0255703 A1   Nov. 1, 2007

(30) Foreign Application Priority Data

May 1, 2006   (JP) ................................. 2006-127885

(51) Int. Cl.
*G06F 17/30* (2006.01)
(52) U.S. Cl. ........................................................ 725/53
(58) Field of Classification Search .................. None
See application file for complete search history.

(56) References Cited

U.S. PATENT DOCUMENTS

| | | | |
|---|---|---|---|
| 6,810,526 B1 * | 10/2004 | Menard et al. .................. 725/46 |
| 7,277,883 B2 * | 10/2007 | DeVorzon et al. ................ 707/3 |
| 7,284,258 B2 * | 10/2007 | Mineyama ...................... 725/58 |
| 2002/0069403 A1 | 6/2002 | Itoh et al. ........................ 725/9 |
| 2002/0083464 A1 * | 6/2002 | Tomsen et al. ................ 725/112 |
| 2004/0158858 A1 * | 8/2004 | Paxton et al. .................. 725/42 |
| 2005/0086692 A1 * | 4/2005 | Dudkiewicz et al. .......... 725/46 |
| 2007/0044010 A1 * | 2/2007 | Sull et al. .................. 715/500.1 |
| 2007/0240187 A1 * | 10/2007 | Beach et al. .................... 725/53 |

FOREIGN PATENT DOCUMENTS

| | | |
|---|---|---|
| JP | 11-134345 | 5/1999 |
| JP | 2000-115098 | 4/2000 |
| JP | 2002-171456 | 6/2002 |
| JP | 2002-325214 | 11/2002 |
| JP | 2004-505563 | 2/2004 |
| JP | 2004-521525 | 7/2004 |
| JP | 2005-080013 | 3/2005 |
| WO | 02/11428 | 2/2002 |
| WO | 02/11446 | 2/2002 |

OTHER PUBLICATIONS

"Service Information for Digital Broadcasting System (ARIB, STD-B10)" Ver. 4.3, Association of Radio Industries and Businesses (English translation).

(Continued)

*Primary Examiner* — Hunter B Lonsberry
*Assistant Examiner* — Rong Le
(74) *Attorney, Agent, or Firm* — Fitzpatrick, Cella, Harper & Scinto

(57) ABSTRACT

An object of the present invention is to propose viewer-desired search words in searching for related programs. A view determining unit identifies viewed programs based on a view history including channel information and time information about the viewed programs, and based on program supplement data held in a program information holding unit. A search word extracting unit 13 extracts search words from the program supplement data about the programs identified by the view determining unit. A program search unit searches for related programs related to the search words by using the extracted search words and the program supplement data held in the program information holding unit.

2 Claims, 25 Drawing Sheets

OTHER PUBLICATIONS

"Coding, Transmission, and Storage Specification for Broadcasting System Based on Home Servers (ARIB, STD-B38)" Ver. 1.2, Association of Radio Industries and Businesses (p. 47-49). (w/ English-language translation).

Japanese Office Action in corresponding Japanese Patent Application No. 2006-127885, dated May 26, 2008.

Japanese Office Action dated Dec. 5, 2008 in corresponding Japanese Application No. 2006-127885.

* cited by examiner

FIG. 3

| NO | CH | START TIME |
|---|---|---|
| 1 | 101 | 2005 / 12 / 12  12 : 00 |
| 2 | 102 | 2005 / 12 / 12  13 : 00 |
| 3 | 106 | 2005 / 12 / 12  13 : 30 |
| 4 | 105 | 2005 / 12 / 12  13 : 31 |
| 5 | 106 | 2005 / 12 / 12  13 : 32 |
| 6 | 105 | 2005 / 12 / 12  13 : 33 |
| 7 | 106 | 2005 / 12 / 12  13 : 34 |
| 8 | 109 | 2005 / 12 / 12  14 : 00 |

FIG. 4

| CH | 12:00 | 13:00 | 14:00 |
|---|---|---|---|
| 101 | | | |
| 102 | | | |
| 103 | | | |
| 104 | | | |
| 105 | | | |
| 106 | | | |
| 107 | | | |
| 108 | | | |
| 109 | | | |

FIG. 6

| PROGRAM | VIEWED TIME LENGTH / PROGRAM TIME LENGTH | RATIO | DETERMINATION | | |
|---|---|---|---|---|---|
| | | | 5% | 50% | 90% |
| A | 60 / 60 | 100% | ○ | ○ | ○ |
| B | 30 / 30 | 100% | ○ | ○ | ○ |
| C | 2 / 30 | 7% | ○ | × | × |
| D | 28 / 30 | 93% | ○ | ○ | × |

FIG. 7

```
<ProgramInformation programId="crid://ch101/tips_xmas_newyear">
<BasicDescription>
<Title>INFORMATION : CHRISTMAS AND NEW YEAR</Title>
<Synopsis>
◇DOMESTIC AND OVERSEAS TRAVEL INFORMATION◇NEW YEAR MOVIES FEATURE◇2005 HIT PRODUCTS
</Synopsis>
</Description>
</BasicDescription>
</ProgramInformation>
```

FIG. 8

```
<SegmentInformation segmentId="SEG 3">
  <ProgramRef crid="crid://ch101/tips_xmas_newyear"/>
  <Description>
    <Title>MOVIE INTRODUCTION</Title>
    <Synopsis>FEATURE : NEW YEAR MOVIES</Synopsis>
    <Keyword>MOVIE</Keyword>
    <CreditList>
      <CreditItem>CAST MEMBER A</CreditItem>
      <CreditItem>CAST MEMBER B</CreditItem>
      <CreditItem>CAST MEMBER C</CreditItem>
    </CreditList>
  </Description>
  <SegmentLocator>
    <MediaRelIncrTimePoint>21</MediaRelIncrTimePoint>
    <MediaIncrDuration>20</MediaIncrDuration>
  </SegmentLocator>
</SegmentInformation>
```

FIG. 9

| | SEGMENT DESCRIPTION | | | | | TIME INFORMATION | | PROGRAM IDENTIFICATION INFORMATION |
|---|---|---|---|---|---|---|---|---|
| | TITLE | PROGRAM CONTENT | KEYWORD | CAST | | START | DURATION | |
| SEG 1 | DOMESTIC TRAVEL | ENJOY FAMILY CHRISTMAS | CHRISTMAS ILLUMINATION | CAST MEMBER D | CAST MEMBER E / CAST MEMBER F | 1 | 10 | crid://ch101/ tips_xmas_ newyear |
| SEG 2 | OVERSEAS TRAVEL | GO OVERSEAS ON WINTER HOLIDAYS! | ITALY AUSTRALIA | CAST MEMBER G | CAST MEMBER H / CAST MEMBER I | 11 | 10 | |
| SEG 3 | MOVIE INTRODUCTION | FEATURE: NEW YEAR MOVIES | MOVIE | CAST MEMBER A | CAST MEMBER B / CAST MEMBER C | 21 | 20 | |
| SEG 4 | SHOPPING | 2005 TOP FIVE HIT PRODUCTS | TREND RANKING | CAST MEMBER J | CAST MEMBER K / CAST MEMBER L | 41 | 10 | |
| SEG 5 | NEWS | NEWS AND WEATHER INFORMATION | NEWS WEATHER | CAST MEMBER M | CAST MEMBER N / CAST MEMBER O | 51 | 10 | |

FIG. 12A

| SEGMENT | VIEWED TIME LENGTH / SEGMENT TIME LENGTH | RATIO | DETERMINATION |
|---|---|---|---|
| SEG 1 | 10 / 10 | 100% | ○ |
| SEG 2 | 10 / 10 | 100% | ○ |
| SEG 3 | 8 / 20 | 40% | × |

FIG. 12B

| SEGMENT | VIEWED TIME LENGTH / SEGMENT TIME LENGTH | RATIO | DETERMINATION |
|---|---|---|---|
| SEG 1 | 10 / 10 | 100% | ○ |
| SEG 2 | 3 / 10 | 30% | × |
| SEG 3 | 8 / 20 | 40% | × |

FIG. 13

| INFORMATION TYPE | NUMBER OF WORDS TO BE CHOSEN | ORDER OF PRIORITY |
|---|---|---|
| KEYWORD | 2 | 1 |
| CAST MEMBER | 2 | 2 |
| SYNOPSIS | 2# | 3 |
| TITLE | 1 | 4 |

WORDS EXTRACTED FROM CHARACTER STRINGS

FIG. 16

| EXEMPLARY ACTIONS | WEIGHTING |
|---|---|
| GUI (e.g., EPG) OPERATION | 0.2 |
| DOUBLE-SCREEN (MAIN) DISPLAY | 0.8 |
| DOUBLE-SCREEN (SUB) DISPLAY | 0.2 |
| (NORMAL) SELECTED-CHANNEL DISPLAY | 1.0 |

FIG. 17

| NO | CH | GENERATED TIME | ACTION |
|---|---|---|---|
| 1 | 101 | 2005 / 12 / 12  12 : 00 | POWER ON |
| 2 | 102 | 2005 / 12 / 12  13 : 00 | SELECT CHANNEL |
| 3 | 102 | 2005 / 12 / 12  13 : 10 | ACTIVATE EPG |
| 4 | 106 | 2005 / 12 / 12  13 : 30 | SELECT CHANNEL FROM EPG |

F I G. 19

| PROGRAM | VIEWED TIME LENGTH / PROGRAM TIME LENGTH | RATIO | DETERMINATION |
|---------|------------------------------------------|-------|---------------|
| A | 60 / 60 | 100% | ○ |
| B | (10 / 30), (20 / 30) | 47%# | × |

WEIGHT FOR VIEWING ALONG WITH EPG OPERATION IS 0.2

FIG. 21

| SEGMENT | VIEWED TIME LENGTH / SEGMENT TIME LENGTH | RATIO | DETERMINATION |
|---|---|---|---|
| SEG 1 | 10 / 10 | 100% | ○ |
| SEG 2 | (1 / 10), (7 / 10), (2 / 10) | 44%# | × |
| SEG 3 | 8 / 20 | 40%# | × |

WEIGHT FOR VIEWING ALONG WITH EPG OPERATION IS 0.2

FIG. 23

| NO | DESIGNATED TIME | CH |
|---|---|---|
| 1 | 2005 / 12 / 12  12 : 08 | 101 |
| 2 | 2005 / 12 / 12  12 : 22 | 101 |
| 3 | 2005 / 12 / 12  12 : 26 | 101 |

PROGRAM SEARCH APPARATUS AND PROGRAM SEARCH METHOD FOR SAME

BACKGROUND OF THE INVENTION

1. Field of the Invention

The present invention relates to program search apparatuses and program search methods for the same, and more particularly to a program search apparatus and a program search method for the same for searching a plurality of programs for a related program related to a viewed program.

2. Description of the Related Art

Recently, broadcast stations have been providing not only conventional video and audio programs, but also supplement data that supplements the programs. The range, content, amount, and so on of supplements for the programs provided by the supplement data are increasing every year. In any of terrestrial digital broadcasting, BS/CS digital broadcasting, terrestrial analog broadcasting, and BS analog broadcasting, a program broadcasting schedule of broadcast stations is provided, for example, for eight days. In addition to the basic data appended to all programs such as the broadcast time and program title, other data is also provided including the program description, cast member information, program video format or audio format, such as whether it is High-Vision video or whether it is stereo broadcasting. Furthermore, various types of data, such as supplement data about serial programs, sequels, and so on, copyright information and information about the age limit for viewing, are appended to many programs. For example, see "Service Information for Digital Broadcasting System (ARIB, STD-B10)" Ver. 4.3, Association of Radio Industries and Businesses.

In addition to the above general supplement data about programs, broadcasting such as server-type broadcasting is expected to provide, and supplement data about specific portions (segment) of programs, such as goal-scoring scenes in sports and scenes in a music program in which a specific artist appears. For example, see "Coding, Transmission, and Storage Specification for Broadcasting System Based on Home Servers (ARIB, STD-B38)" Ver. 1.2, Association of Radio Industries and Businesses (p. 47-49).

By processing this supplement data in a receiver, the supplement data can be displayed as an EPG (electronic program guide) to support a viewer in selecting a program, for example. That is, broadcast stations as senders, or the receiver as a recipient, can process the program supplement data with a specific intention and serve the convenience of the viewer in various ways. For example, Japanese Patent Laid-Open No. 2002-325214 describes a receiver that uses a keyword in a program to refer to related programs.

In the receiver described in the above Japanese Patent Laid-Open No. 2002-325214, when a program consists of theme blocks aligning along a timeline, the keyword used for referring to related programs is one belonging to a theme block at the time of issuing a request by a viewer.

However, even when the program being watched consists of theme blocks (hereafter referred to as segments), the viewer may not necessarily recognize the structure of the segments, such as the range of one segment. A segment is typically defined by its start position and by its end position or duration time. Therefore, the viewer sometimes feels that the proposed keyword (hereafter referred to as a search word) is inappropriate.

If the viewer issues the request just after the start of a certain segment, a search word based on the segment of which only a small part has been watched is proposed. Therefore, the proposed search word may not be what the viewer desires.

In addition, since the search word is extracted based on the segment being watched, the search request must be issued when a scene in which a search is desired is displayed. Such a scene is often one that the viewer is interested in and definitely desires to watch. Therefore, the viewer may forget to perform a search request operation, or the viewer's attention may be distracted from viewing by performing the search operation.

SUMMARY OF THE INVENTION

An object of the present invention is to provide a program search apparatus and a control method that enable proposing viewer-desired search words in searching for related programs. Another object of the present invention is to provide a program search apparatus and a control method that enable searching for related programs at any time when viewing is not disturbed.

To accomplish the above objects, the program search apparatus according to an aspect of the present invention includes a program search apparatus for searching a plurality of programs for a related program related to a viewed program, comprising: a program information holding unit configured to hold program supplement data including channel information and broadcast time information for each program; a view determining unit configured to identify a viewed program based on a view history including channel information and time information about the viewed program, and based on the program supplement data held in the program information holding unit; a search word extracting unit configured to extract a search word according to a predetermined extracting condition from the program supplement data about the program identified by the view determining unit; and a program search unit configured to search the plurality of programs for the related program related to the search word by using the search word extracted by the search word extracting unit and the program supplement data held in the program information holding unit.

To accomplish the above objects, the program search apparatus according to another aspect of the present invention includes a program search apparatus for searching a plurality of programs for a related program related to a viewed program, comprising: a program information holding unit configured to hold program supplement data including channel information and broadcast time information for each program and segment supplement data about each of a plurality of segments in each program segmented along a timeline; a designated request holding unit configured to hold a designated request history in response to a designated request designating a segment from a viewer; a search word extracting unit configured to extract a search word according to a predetermined extracting condition from the segment supplement data about the designated segment based on the designated request history held in the designated request holding unit; and a program search unit configured to search the plurality of programs for the related program related to the search word by using the search word extracted by the search word extracting unit and the program supplement data held in the program information holding unit.

To accomplish the above objects, the control method for the program search apparatus according to still another aspect of the present invention includes a method for controlling a program search apparatus for searching a plurality of programs for a related program related to a viewed program, comprising the steps of: holding program supplement data including channel information and broadcast time information for each program; determining view to identify a viewed program based on a view history including channel information and time information about the viewed program, and based on the program supplement data held in the holding step; extracting a search word according to a predetermined extracting condition from the program supplement data about the program identified in the determining step; and searching the plurality of programs for the related program related to the search word by using the search word extracted in the extracting step and the program supplement data held in the holding step.

To accomplish the above objects, the control method for the program search apparatus according to still another aspect of the present invention includes a method of controlling a program search apparatus for searching a plurality of programs for a related program related to a viewed program, comprising: holding program supplement data including channel information and broadcast time information for each program and segment supplement data about each of a plurality of segments in each program segmented along a timeline; holding a designated request history in response to a designated request designating a segment from a viewer; extracting a search word according to a predetermined extracting condition from the segment supplement data about the designated segment based on the designated request history held in the designated request holding step; and searching the plurality of programs for the related program related to the search word by using the search word extracted in the extracting step and the program supplement data held in the program supplement data holding step.

According to the present invention, by using a view history to identify viewed programs or segments, viewer-desired search words can be proposed. In addition, by receiving a designated request designating a segment from a viewer and using a designated-request history, related programs can be searched at any time when viewing is not disturbed.

Further features of the present invention will become apparent from the following description of exemplary embodiments (with reference to the attached drawings).

BRIEF DESCRIPTION OF THE DRAWINGS

FIG. 3 is a diagram showing an exemplary view history in the program search apparatus in the first embodiment of the present invention;

FIG. 4 is a diagram showing an exemplary program schedule in the program search apparatus in the first embodiment of the present invention;

FIG. 6 is a diagram showing an exemplary result of the view determination on a program basis in the program search apparatus in the first embodiment of the present invention;

FIG. 7 is a diagram showing an exemplary description of program supplement data about a program in the program search apparatus in the first embodiment of the present invention;

FIG. 8 is a diagram showing an exemplary description of segment supplement data about a segment in the program search apparatus in the first embodiment of the present invention;

FIG. 9 is a diagram showing exemplary content of segment supplement data about segments in the program search apparatus in the first embodiment of the present invention;

FIGS. 12A and 12B are diagrams showing an exemplary result of the view determination on a segment basis in the program search apparatus in the first embodiment of the present invention;

FIG. 13 is a diagram showing exemplary search word extraction sources in the program search apparatus in the first embodiment of the present invention;

FIG. 16 is a diagram showing exemplary operations to be included in the view history in the program search apparatus in a second embodiment of the present invention;

FIG. 17 is a diagram showing an exemplary view history in the second embodiment of the present invention;

FIG. 19 is a diagram showing an exemplary result of the view determination on a program basis in the program search apparatus in the second embodiment of the present invention;

FIG. 21 is a diagram showing an exemplary result of the view determination on a segment basis in the program search apparatus in the second embodiment of the present invention;

FIG. 23 is a diagram showing an exemplary designated history in the program search apparatus in the third embodiment of the present invention;

DESCRIPTION OF THE EMBODIMENTS

Figure 1:
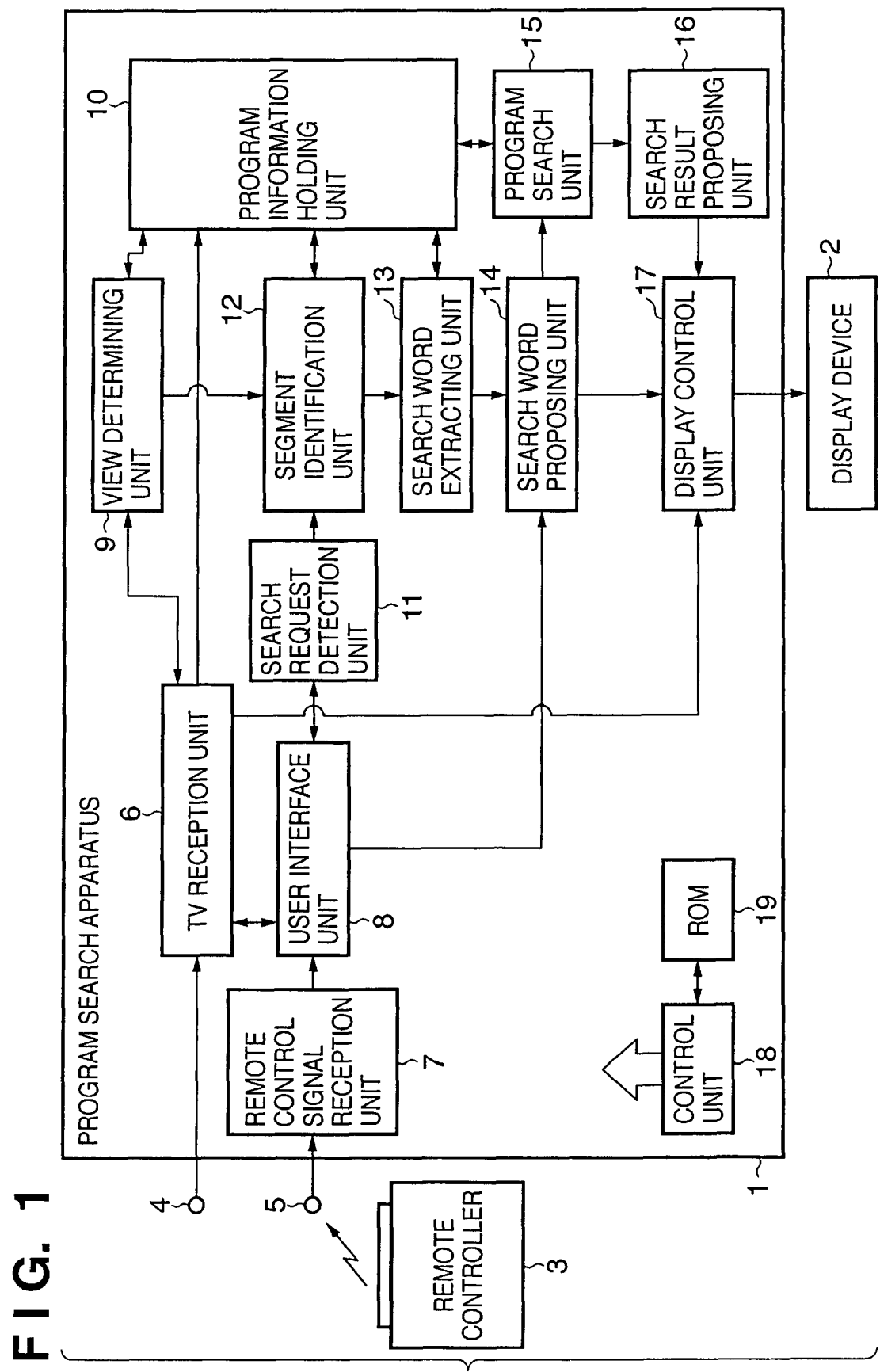
FIG. 1 is a block diagram showing the functional configuration of a program search apparatus applied as a first embodiment of the present invention.

Referring to the drawings, embodiments of the present invention will be described below.

First Embodiment

FIG. 1 is a block diagram showing the general configuration of a program search apparatus 1 to which a first embodiment of the present invention is applied and a display device 2 connected to the program search apparatus 1. In FIG. 1, a TV (television broadcasting) reception unit 6 receives and accumulates video and audio program data and supplement data appended to the program data contained in a TV broadcast wave input from an RF terminal 4. The TV reception unit 6 outputs these data items after subjecting them to processing such as channel selection processing. The output signal from the TV reception unit 6 is supplied to the display device 2 via a display control unit 17. The TV reception unit 6 includes a channel selection circuit that performs the channels selection processing. The program search apparatus 1 may be, for example, an apparatus such as a broadcast receiver that receives broadcasting including server-type broadcasting, terrestrial digital broadcasting, BS/CS digital broadcasting, and CATV broadcasting, or a receiver that receives program information over the Internet.

A user interface unit 8 receives, from a viewer who uses a remote controller 3, an instruction as a remote control signal via an input terminal 5 and a remote control signal reception unit 7. The user interface unit 8 controls operation of the TV reception unit 6 according to the viewer's instruction. The viewer operates the remote controller 3 to provide instructions such as "Select a channel" and "Activate an electronic program guide" and to provide various instructions via an operation screen that displays choices such as "YES" and "NO".

A view determining unit 9 monitors and stores channel selection operations of the TV reception unit 6 and judges whether each segment in a program was "viewed" or "not viewed." Detailed operations of the view determining unit 9 will be described later.

A program information holding unit 10 holds supplement data about programs received by the TV reception unit 6. The supplement data includes program supplement data about an entire program, such as the program title, broadcast time, broadcast channel, and program description, and segment supplement data about each segment in the program, such as the segment title, segment start position, and segment end position or duration time. For example, suppose that the program watched is a soccer game and the segments are shooting scenes. In this case, the segment title of a segment may be "shot 1", the segment start position may be "15 minutes and 30 seconds after the start of the program", and the segment description may be "a shot by a corner kick 10 minutes after the start of the program, but missed the goal". The program information holding unit 10 holds supplement data about programs received in the past, as well as supplement data about programs (programs to be broadcasted) listed in an EPG (electronic program guide) from broadcast stations. For example, supplement data about all programs of all broadcast stations for the next eight days may be held in the program information holding unit 10. The program information holding unit 10 may be configured to automatically load the supplement data about all programs of all broadcast stations for the next eight days without being noticed by the viewer.

A search request detection unit 11 monitors the user interface unit 8 to detect that a search request for related programs has been input by the viewer with the remote controller 3. The search request detection unit 11 notifies a segment identification unit 12 to identify segments from which search words are to be extracted. The search request for related programs may be input by pressing a particular button on the remote controller 3 or by selecting and entering "Search related programs" via an operation screen such as a menu.

Upon the search request for related programs, the segment identification unit 12 uses the supplement data in the program information holding unit 10 to identify segments determined by the view determining unit 9 as "viewed." Detailed operations of the segment identification unit 12 will be described later.

A search word extracting unit 13 analyzes segment supplement data about the segments identified by the segment identification unit 12 and extracts one or more search words. A search word proposing unit 14 presents a related-program search screen on which the search words extracted by the search word extracting unit 13 are displayed as choices. A program search unit 15 uses the supplement data in the program information holding unit 10 to search for programs (related programs) matching a search word selected by the viewer. A search result proposing unit 16 creates a search result screen on which programs (related programs) matching the search word are arranged to facilitate the viewer's recognition. The search result screen created by the search result proposing unit 16 is displayed on the display device 2 via the display control unit 17.

Figure 2:
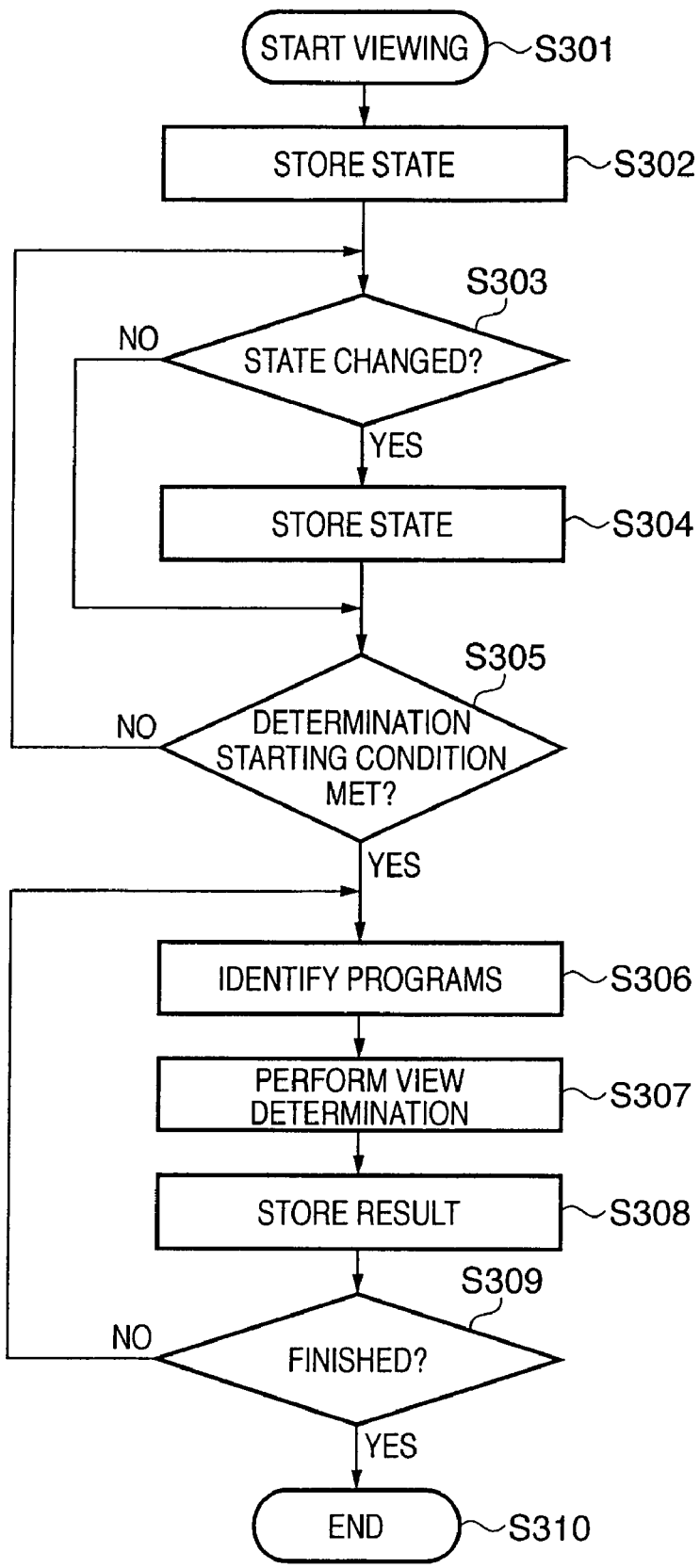
FIG. 2 is a flowchart describing processing operations of view determination in the program search apparatus in the first embodiment of the present invention.

Now, processing of the view determining unit 9 for performing the view determination will be described below by way of example. FIG. 2 shows the process flow in the view determining unit 9.

In step S301, the TV reception unit 6 starts the channel selection processing in response to an event such as power-on or a video switching request from an externally connected apparatus. The process proceeds to step S302, where the view determining unit 9 stores the channel selection state of the TV reception unit 6. The process proceeds to step S303, where the view determining unit 9 checks whether or not the channel selection state of the TV reception unit 6 has been changed. If the channel selection state of the TV reception unit 6 has been changed, the process proceeds to step S304 to store the changed channel selection state and then proceeds to step S305. If the channel selection state of the TV reception unit 6 has not been changed, the process proceeds from step S303 to step S305. The channel selection state stored in steps S302 and S304 includes at least a value identifying the selected channel (e.g., the channel number or channel ID) and the channel selection start time. This record of each change in the channel selection state will herein be referred to as a view history.

FIG. 3 shows an exemplary view history. In FIG. 3, viewing of a channel 101 was started at 12:00 on Dec. 12, 2005 (history No. 1), and a channel 102 was selected one hour later at 13:00 (history No. 2) to start viewing of the channel 102. Further, a channel 106 was selected 30 minutes later at 13:30 (history No. 3) to start viewing of the channel 106. Subsequently, channels 105, 106, 105, and 106 were selected at intervals of one minute (history Nos. 4, 5, 6, and 7), and a channel 109 was selected at 14:00 (history No. 8), Here, the current time is 14:00.

Returning to FIG. 2 to continue the description, as long as a condition for starting the view determination is not met in step S305, the process returns to step S303. Therefore, the view history is continuously updated as in the history Nos. 4, 5, 6, and 7. If the condition for starting the view determination is met in step S305, the process proceeds to step S306 to identify programs by matching the supplement data in the program information holding unit 10 with the view history.

As exemplary condition for starting the view determination may be "Has a predetermined period (e.g., 30 minutes or three hours) passed?" or "Has the number of history items stored as the view history reached a predetermined number (e.g., 10 or 50)?" Alternatively, the view determination may be started based on the fact that the TV reception unit 6 enters a specific state in response to an event such as a search request for related programs or a request to finish TV viewing. The reason of adopting the request to finish TV viewing here is to prevent the situation where the view determination based on the view history up to just before finishing viewing is performed the next time (at the time of a request to start TV viewing).

Figure 5:
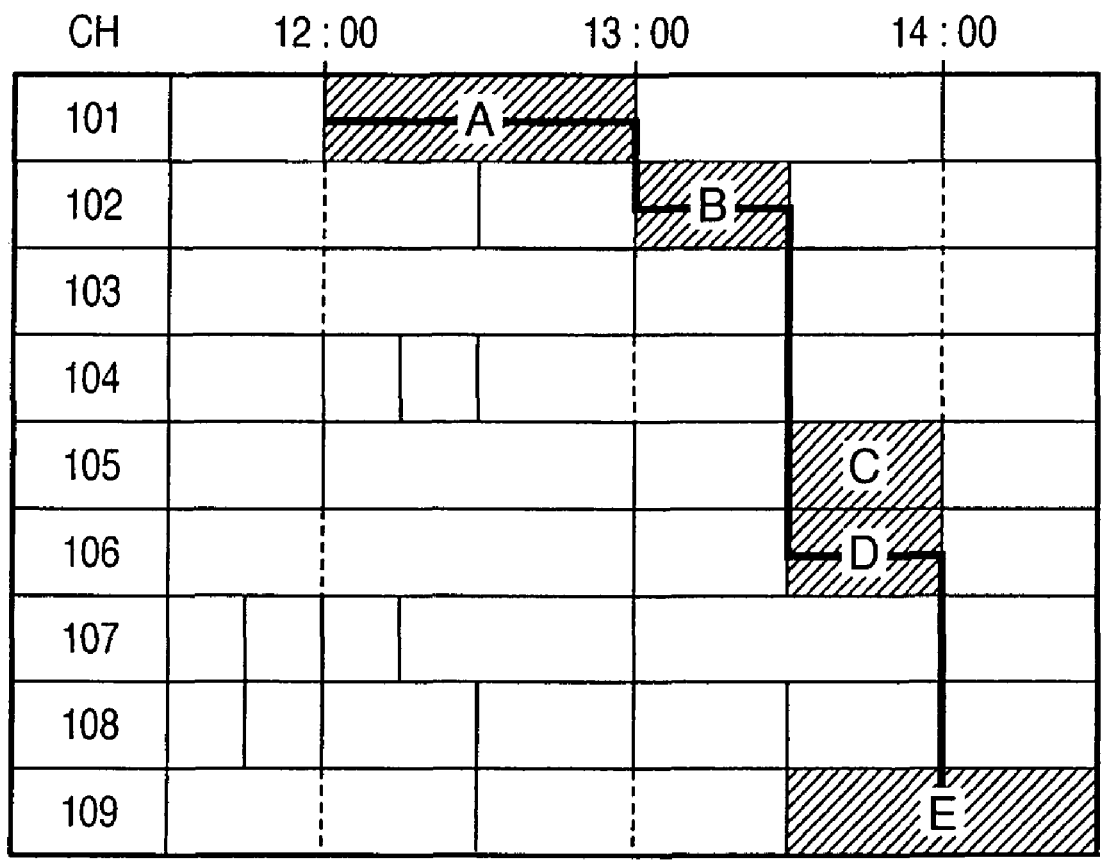
FIG. 5 is a diagram showing exemplary correspondence between the view history and the program schedule in the program search apparatus in the first embodiment of the present invention.

Applying the view history shown in FIG. 3 to a program schedule shown in FIG. 4 reveals that programs displayed on the display device 2 even for a short time are programs A, B, C, D, and E as shown in FIG. 5. A bold line in FIG. 5 is a visual representation of the channel selection state. Since the current time is 14:00 and a view history item for the program E has not been generated yet, the bold line does not extend into the program E. The program schedule shown in FIG. 4 is obtained from the broadcast channels and the broadcast time (the start time and the end time/duration time) of programs contained in the program supplement data in the program information holding unit 10. For example, a broadcast program on the channel 101 indicated by the history No. 1 in FIG. 3 corresponds to a one-hour program from 12:00 to 13:00 on the channel 101 in FIG. 4 (the program A in FIG. 5). Similarly, a broadcast program on the channel 106 indicated by the history Nos. 3, 5, and 7 corresponds to a 30-minute program from 13:30 to 14:00 on the channel 106 in FIG. 4 (the program D in FIG. 5).

Returning to FIG. 2, for a program identified as having been displayed on the display device 2 even for a short time by matching the view history and the program supplement data, it is judged in step S307 whether or not the program was watched. The result of the determination is stored in step S308. The determination in step S307 as to whether or not the program was watched is made based on whether or not the ratio of the total viewed time length of the program (total time length for which the channel was kept selected) exceeds a threshold.

Next, it is determined in step S309 whether the view determination has been performed and the result has been stored for all identified programs. If the view determination has not been performed and the result has not been stored for all identified programs, the process returns from step S309 to step S306 to repeat the operations between steps S306 and S309. If the view determination has been performed and the result has been stored for all identified programs, the process proceeds to step S310 to finish the processing of the view determining unit 9.

FIG. 6 shows the ratio of the total viewed time length (viewed time length/program time length) and the result of the view determination for each of the programs A, B, C, and D identified from the view history and the program schedule shown in FIGS. 3, 4, and 5. As shown in FIG. 6, the program C is determined to be "not viewed" as indicated by the determination "x" if the threshold is 50% or 90%, whereas the program C is determined to be "viewed" as indicated by the determination "O" if the threshold is 5%. The view determination for a program consisting of a plurality of segments is performed on a segment basis.

For example, if the program A shown in FIG. 5 consists of five segments, five pieces of segment supplement data corresponding to the five segments are held in the program information holding unit 10.

FIG. 7 shows exemplary program supplement data about the program A, and FIG. 8 shows exemplary segment supplement data about one of the segments in the program A. Referring to FIG. 7, it can be seen that the program title of the program A identified by "crid://ch101/tips_xmas_newyear" is "Christmas and New Year." Referring to FIG. 8, it can also be seen that the segment identified by "SEG3" has the segment title "Movie Introduction", the segment start position 21 (20 minutes after the start of the program), and the segment duration time 20 (20 minutes).

FIG. 9 shows exemplary segment supplement data about the five segments SEG1 to SEG5 constituting the program A. Segment supplement data about the third segment SEG3 in FIG. 9 has been shown in FIG. 8. The view determination on a segment basis is performed based on whether or not the ratio of the total viewed time length for a segment exceeds the threshold. The result of the determination is stored on a segment basis.

Now, by way of example, description will be given below of processing of the segment identification unit 12 for identifying "viewed" segments in a program being watched in response to notification from the search request detection unit 11.

Figure 10:
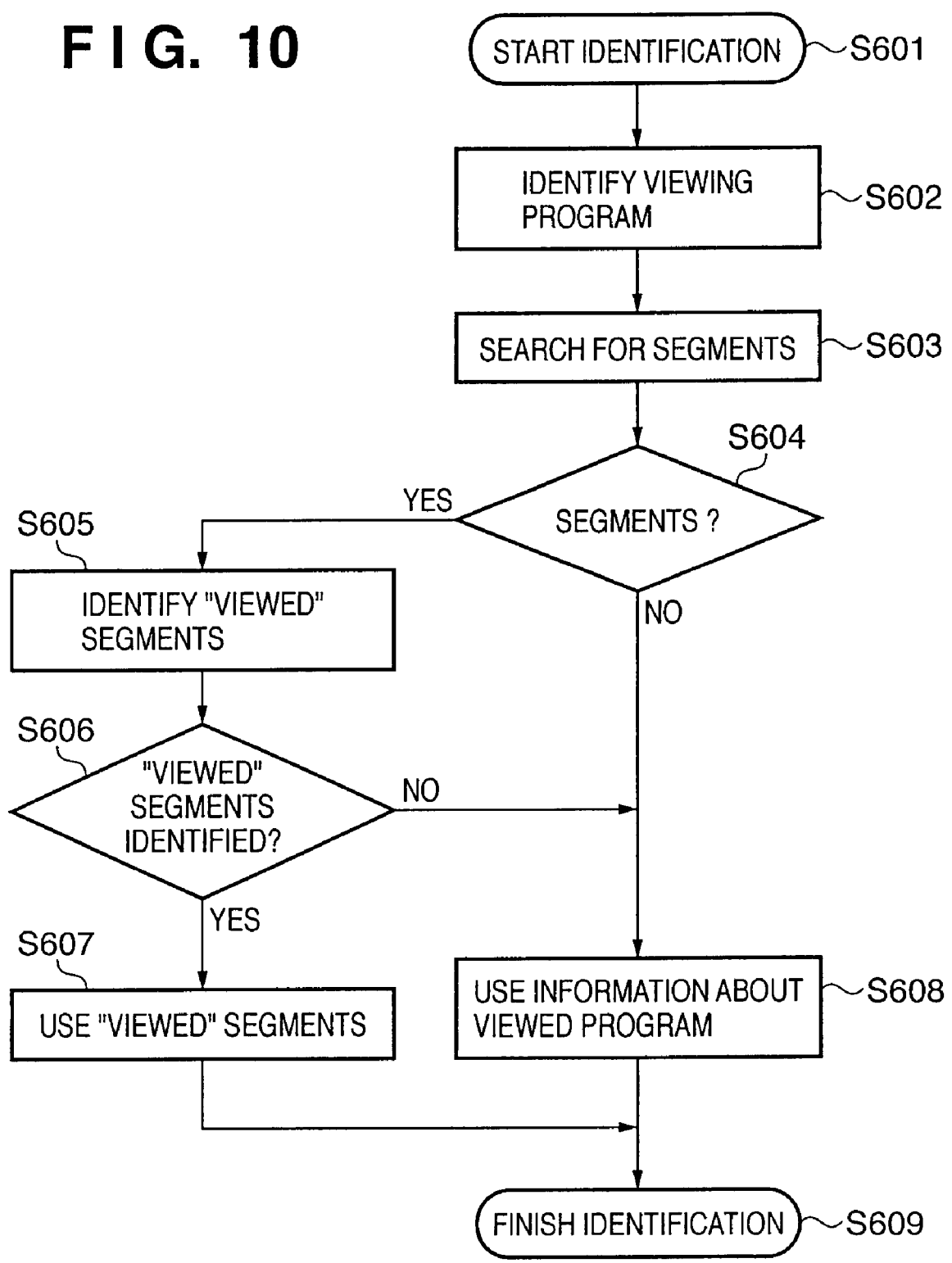
FIG. 10 is a flowchart describing processing operations of segment identification in the program search apparatus in the first embodiment of the present invention.

FIG. 10 shows a process flow in the segment identification unit 12. Once notified of a search request for related programs by the search request detection unit 11, the segment identification unit 12 starts the processing in step S601. In step S602, a program being watched is identified based on the time the search request for related programs was generated and program supplement data about programs held in the program information holding unit 10. The process proceeds to step S603 to search for segment supplement data about segments of the identified program. The segment supplement data about the segments is searched by using program identification information contained in the program supplement data about the program identified as being watched.

If the program A is being watched and "crid://ch101/tips_xmas_newyear" in FIG. 7 is the program identification information indicated in the program supplement data about the program A, the five segments (SEG1 to SEG5) shown in FIG. 9 are searched.

In step S604, the segment identification unit 12 determines whether or not the program being watched has segments. If the program being watched has no segments, the process proceeds from step S604 to step S608, where the program supplement data about the program is set as supplement data from which search words are to be extracted. If the program being watched has segments, the process proceeds from step S604 to step S605 to identify segments determined by the view determining unit 9 as "viewed." If segments determined to be "viewed" are identified in step S606, the process proceeds to step S607, where segment supplement data about the segments determined to be "viewed" are set as supplement data from which search words are to be extracted. However, if segments determined to be "viewed" are not identified in step S606, the process proceeds to step S608, where the program supplement data about the program is set as supplement data from which search words are to be extracted. The identification processing is finished in step S609.

Figure 11A:
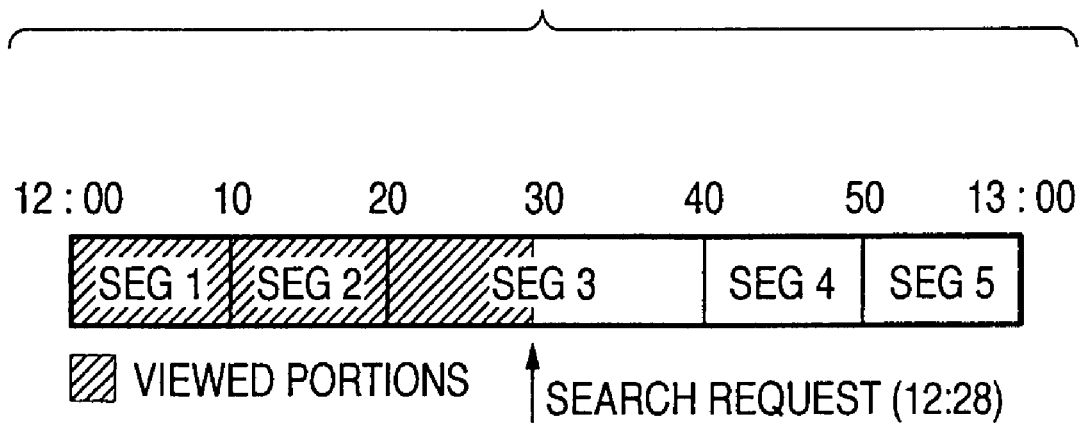
FIGS. 11A and 11B are diagrams showing exemplary correspondence between the view history and a segment structure in the program search apparatus in the first embodiment of the present invention.
Figure 11B:
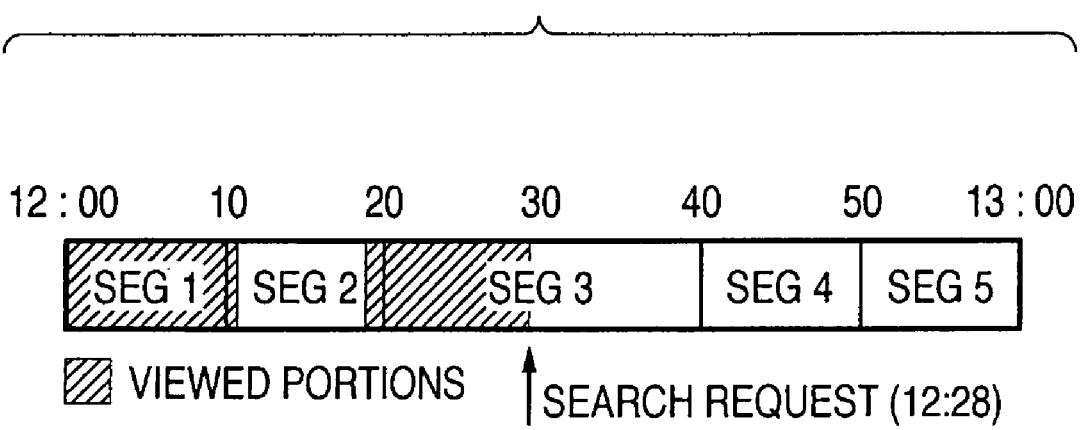

FIGS. 11A and 11B show the viewing state where a search request for related programs was generated at 12:28 during the viewing of the program A shown in FIG. 9. FIG. 11A shows the case where the program A was watched continuously from the start of broadcasting of the program. FIG. 11B shows the case where the program A was not watched for seven minutes from 11 minutes after the start of broadcasting of the program. FIGS. 12A and 12B are diagrams showing the ratios of the total viewed time length (viewed time length/segment time length) and the view determination results of the program A corresponding to FIGS. 11A and 11B respectively. The threshold for the view determination by the view determining unit 9 is 50%.

Once the supplement data from which search words are to be extracted is identified, the search word extracting unit 13 extracts search words from information contained in the identified supplement data. The search word proposing unit 14 presents on the display device 2 a related-program search screen on which the search words extracted by the search word extracting unit 13 are displayed as choices. Conditions for extracting search words may be preset, or designated by the viewer in advance, or set based on preference information obtained from viewer's designation or the view determination results. FIG. 13 shows exemplary conditions for extracting search words. In FIG. 13, the number of search words to be chosen out of potential search words and the order of priority are set as extracting conditions for each of the "keyword", "cast member", "synopsis", and "title" of a program.

Figure 14A:
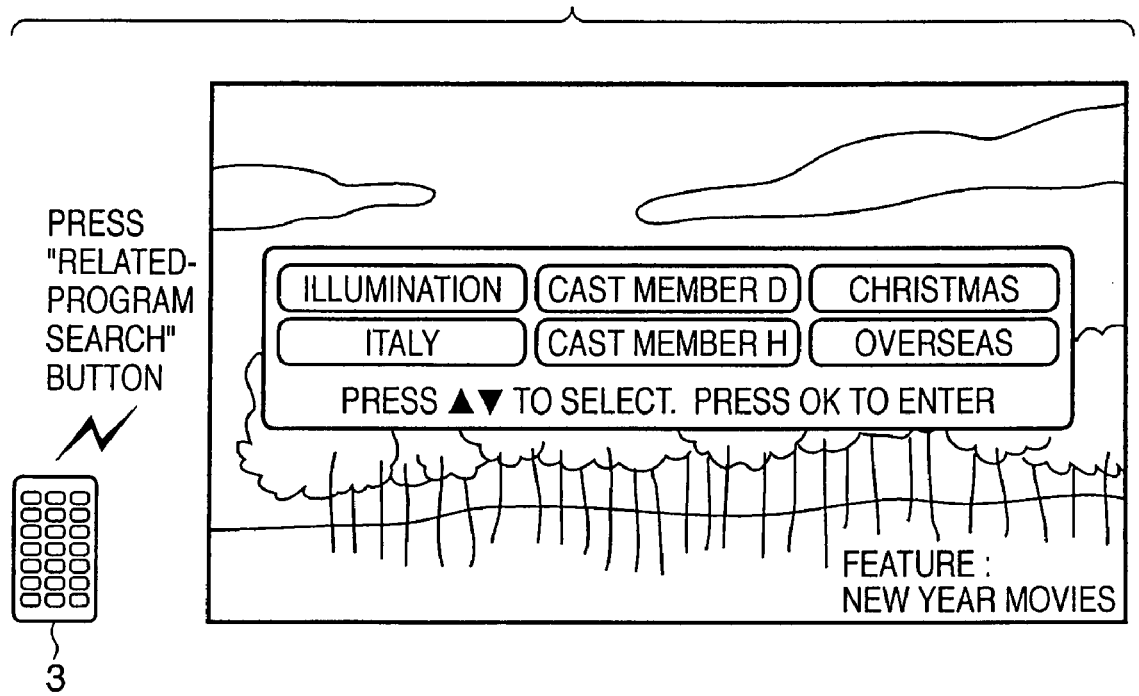
FIGS. 14A and 14B are diagrams showing exemplary related-program search screens in the program search apparatus in the first embodiment of the present invention.
Figure 14B:
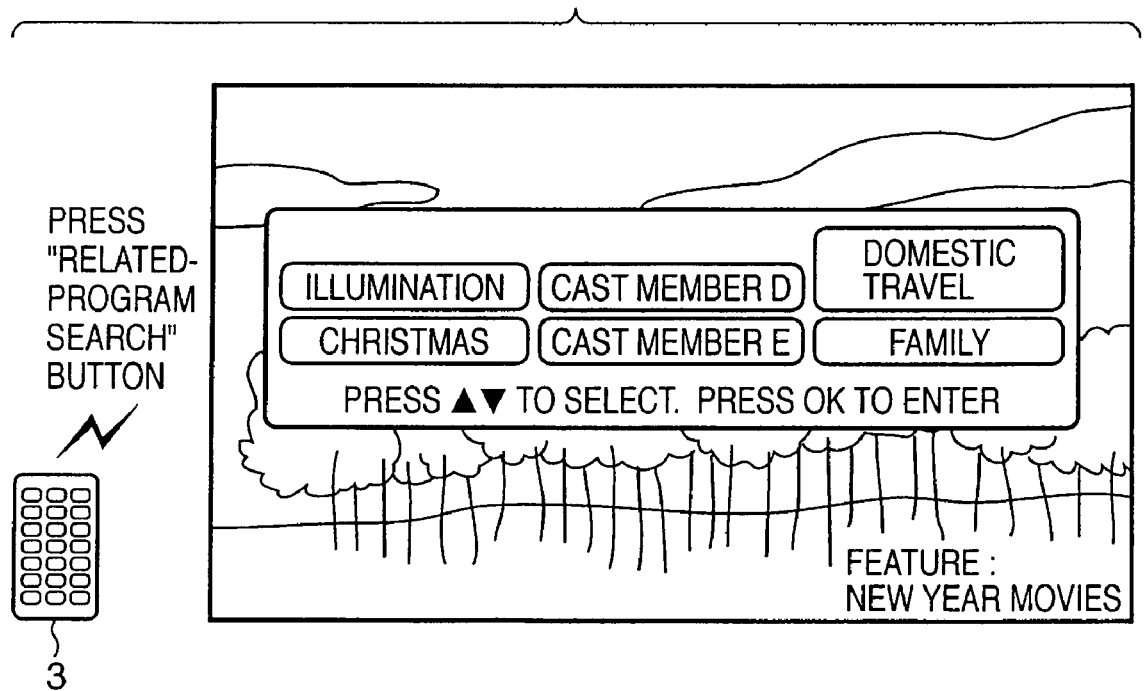

FIGS. 14A and 14B are diagrams showing exemplary related-program search screens presented with the extracted search words. FIG. 14A shows the case where, for the segments SEG1 and SEG2 determined to be "viewed" in FIG. 12A, six search words are extracted by using the segment supplement data shown in FIG. 9 and the extracting conditions shown in FIG. 13. FIG. 14B shows the case where, for the segment SEG1 determined to be "viewed" in FIG. 12B, six search words are extracted by using the segment supplement data shown in FIG. 9 and the extracting conditions shown in FIG. 13. Since the two segments SEG1 and SEG2 have been determined to be "viewed" in FIG. 12A, six search words in total, that is, two from the keyword, two from the cast member, and two from the synopsis are presented on the display device 2 as shown in FIG. 14A. On the other hand, only the segment SEG1 has been determined to be "viewed" in FIG. 12B. Therefore, six search words in total, that is, two from the keyword, two from the cast member, one from the synopsis (reduced to one due to the overlap with the keyword although the number of extracted words are set to two), and one from the title are presented on the display device 2 as shown in FIG. 14B.

If the number of potential search words is greater than the set number of search words to be chosen (e.g., if two cast members are chosen out of six cast members), the search words may be narrowed down in order of appearance or in order of character code, for example. Alternatively, the search words may be narrowed down in order of usage record (how many times each word has been used as a search word) or in order of preference.

Once the viewer designates a desired search word on the related-program search screen, the program search unit 15 checks whether any supplement data about programs held in the program information holding unit 10 matches the designated search word. Basically, the supplement data about all programs of all broadcast stations loaded as EPG data is searched. The search result proposing unit 16 presents a search result screen on the display device 2.

If no programs match the designated search word, the display device 2 may display a search result screen with a message such as "No related programs are found." or a search result screen with an empty list. If programs matching the designated search word are found, the display device 2 displays a search result screen with a program list containing information such as the title, broadcast channel, and broadcast time of each program obtained from the supplement data about the matching programs.

Figure 15:
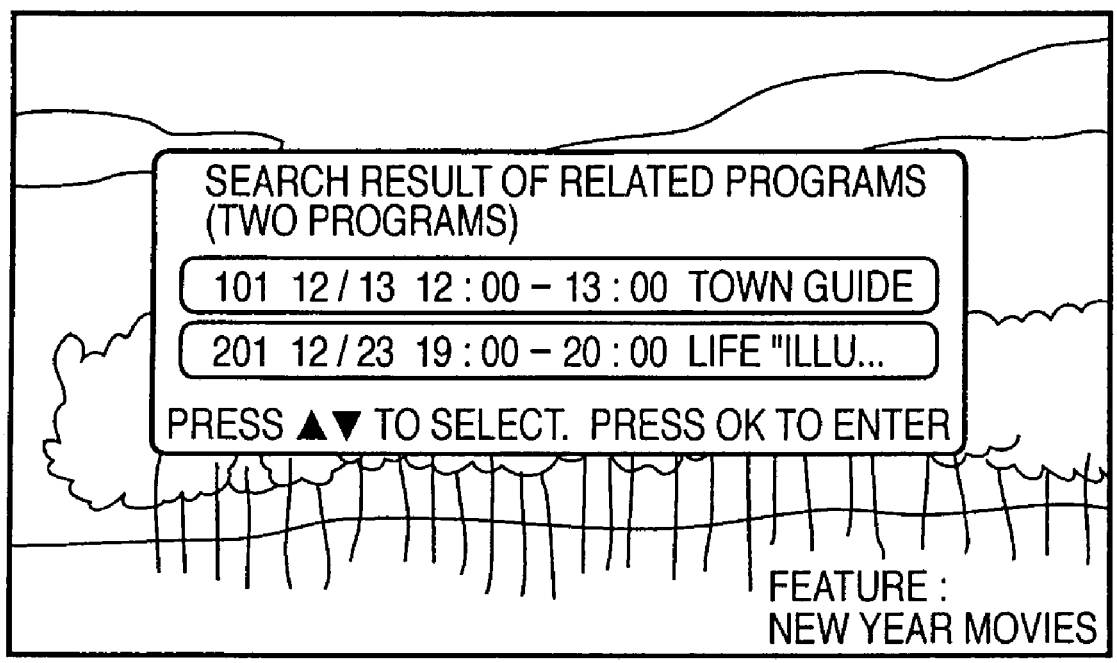
FIG. 15 is a diagram showing an exemplary search result screen in the program search apparatus in the first embodiment of the present invention.

FIG. 15 shows an exemplary search result screen displayed when two programs matching the designated search word are found. What the viewer can do with the displayed search result screen may include causing display of the supplement data about a program selected in the program list, such as the synopsis and cast member, or programming the recording of the selected program.

Thus, search words are extracted from segment supplement data about segments determined to be "viewed." Therefore, different search words may be proposed as shown in FIGS. 14A and 14B for different search requests for related programs issued at the same time (12:28). The viewer will not feel that the proposed search words are inappropriate because no search words are proposed from segments which are determined to be "not viewed."

In addition, even when a search request for related programs is generated just after the start of a segment, search words are proposed from past segments determined to be "viewed" rather than from the current segment. This increases the probability of viewer-desired search words being proposed.

According to the above-described first embodiment, only by issuing a search request for related programs at any time, the viewer can search for programs using search words from segments determined to be "viewed" by the viewer.

The present invention covers the case where software program code for implementing the processing described in the above embodiment is stored in a computer (CPU or MPU) used for the method of searching for related-programs and the program code is executed.

The program code and a storage medium containing the program code (such as a floppy disk, hard disk, optical disk, magneto-optical disk, CD-ROM, magnetic tape, nonvolatile memory, or ROM) also constitute the present invention.

Second Embodiment

The first embodiment has been described for the case where the view determination is performed based on the view history generated by monitoring channel selection operations. In a second embodiment, the view determination is performed based on a view history generated by monitoring other operations in addition to channel selection operations. The operations other than channel selection operations refer to operations performed while the channel selection state is maintained, such as displaying/operating the electronic program guide, viewing programs in double-screen, and so on. Operations that do not involve a channel selection operation, such as photograph display and web browsing in full-screen, are not be included in the view history.

Information that the view determining unit 9 stores as the view history by monitoring an operation while a channel is selected by the TV reception unit 6 includes at least a value identifying the selected channel (e.g., the channel number or channel ID), the start time of that operation, and a value identifying that operation (e.g., the action name or action ID).

FIG. 16 shows exemplary operations (actions) to be included in the view history. With reference to FIG. 16, a weighting factor is preset for each of the actions "GUI operation", "double-screen (main) display", "double-screen (sub) display", and "(normal) selected-channel display." In the example shown in FIG. 16, the weighting factors for the "GUI operation", "double-screen (main) display", "double-screen (sub) display", and "(normal) selected-channel display" are 0.2, 0.8, 0.2, and 1.0 respectively. By way of example, description will be given below of processing of the view determining unit 9 for performing the view determination for programs and segments based on the view history and supplement data.

FIG. 17 shows an exemplary view history. In FIG. 17, a channel 101 was selected upon power-on at 12:00 on Dec. 12, 2005 (history No. 1). A channel 102 was selected one hour later at 13:00 (history No. 2), and viewing of the EPG (electronic program guide) was started 11 minutes later at 13:11

(history No. 3). A channel 106 was selected from the EPG 20 minutes after at 13:30 (history No. 4).

Figure 18:
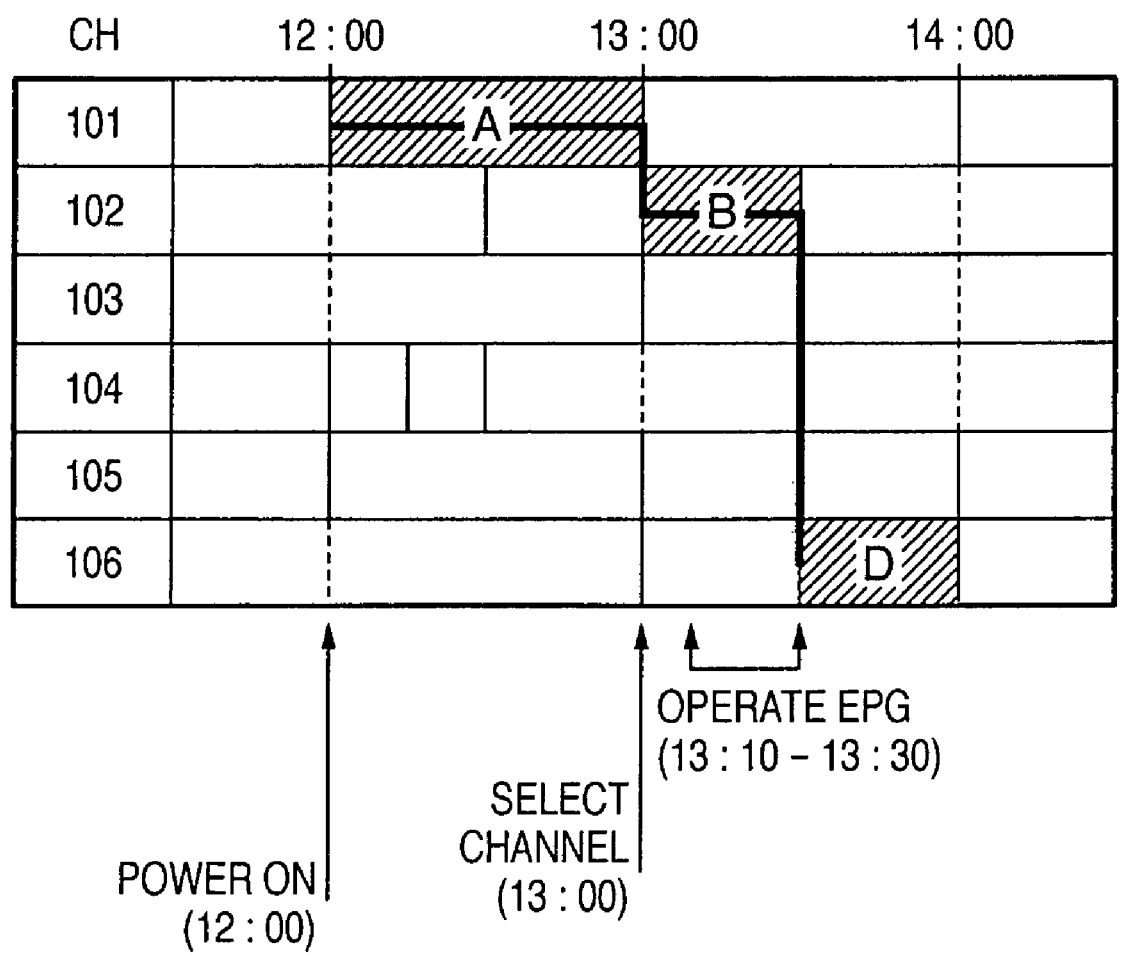
FIG. 18 is a diagram showing exemplary correspondence between the view history and the program schedule in the program search apparatus in the second embodiment of the present invention.

Applying the view history shown in FIG. 17 to the program schedule shown in FIG. 4 reveals that programs displayed on the display device 2 even for a short time are programs A, B, and D as shown in FIG. 18. A bold line in FIG. 18 is a visual representation of the channel selection state. FIG. 19 shows the ratio of the total viewed time length (viewed time length/program time length) and the result of the view determination for each of the programs A and B identified from the view history shown in FIG. 17 and the broadcast schedule. It can be seen from the view history Nos. 1 and 2 in FIG. 17 that no operations other than the channel selection operation were performed during the one-hour program A starting at 12:00.

Therefore, since the ratio of the total viewed time length of 60 minutes to the program time length of 60 minutes is 100%, the program A is determined to be "viewed" (determination "O"). It can be seen from the view history Nos. 2, 3, and 4 in FIG. 17 that the 30-minute program B starting at 13:00 was watched on a normal program screen for ten minutes from the start of the program, and then watched along with EPG browsing for 20 minutes after ten minutes from the start of the program. When a viewer watched a program while browsing an EPG, the viewer often did not grasp the content of the program compared to watching only the program, and the viewer often does not recognize that the viewer "watched" the program. Therefore, as shown in FIG. 16, the weighting factor for the action "GUI operation" is set to 0.2.

Using the weighting factor to calculate the total viewed time length used for the view determination allows these differences in the viewing state to be reflected on the result of the view determination.

The supposed viewed time length of the program B shown in FIG. 19 is calculated using the weighting factor 1 for the period from 13:00 to 13:10 and using the weighting factor 0.2 for the period from 13:10 to 13:29, so that 10 minutes×1 and 20 minutes×0.2 results in 14 minutes in total. This supposed viewed time length is the time length calculated in consideration of the degree of grasping the content rather than the actual viewed time length. Therefore, the view ratio of the program B is 14 minutes/30 minutes, i.e., about 47%. With the threshold of 50%, the program B is determined to be "not viewed" (determination "x").

Figure 20:
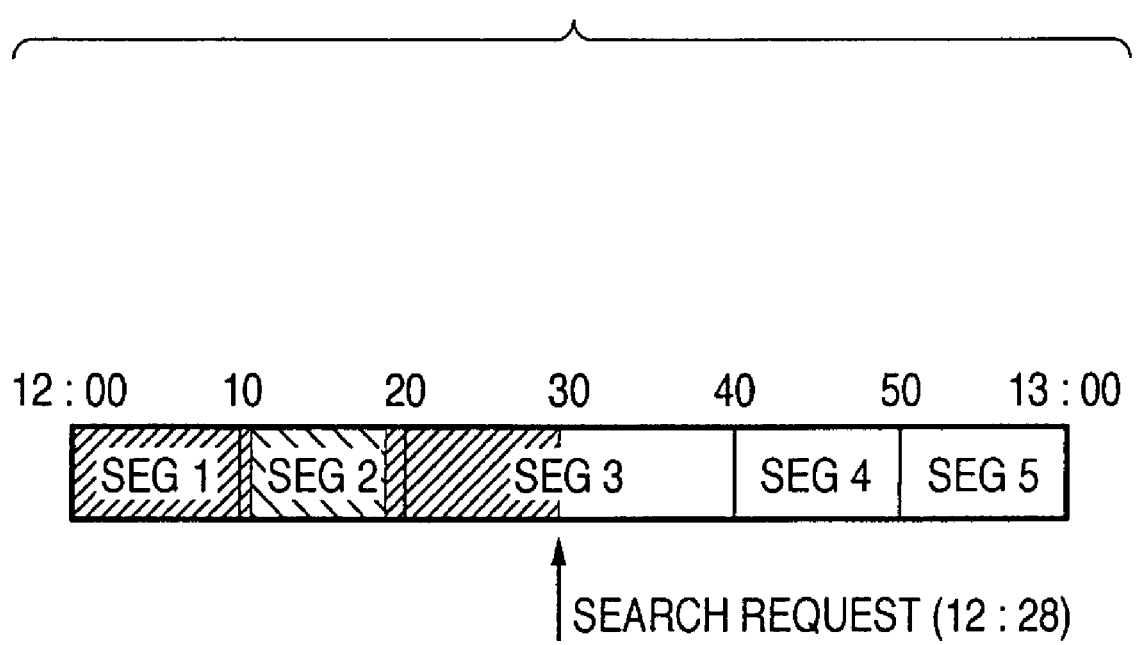
FIG. 20 is a diagram showing exemplary correspondence between the view history and the segment structure in the program search apparatus in the second embodiment of the present invention.

FIG. 20 shows the viewing state where the program A consists of the five segments SEG1 to SEG5 shown in FIG. 9 and a search request for related programs is generated at 12:28 while the program A is being watched. It is assumed that the viewer watched only the program A for 11 minutes after the start of the program A and then watched the program A while browsing the EPG for seven minutes.

FIG. 21 shows the ratios of the total viewed time length (viewed time length/segment time length) and the results of the view determination for the program A in this case. In FIG. 21, since the segment SEG1 was continuously watched for ten minutes from 12:00, the ratio of the total viewed time length is 100% and the segment SEG1 is determined to be "viewed" (determination "O"). Here, the threshold for the view determination by the view determining unit 9 is 50. The ten-minute segment SEG2 starting at 12:10 was watched along with EPG browsing for seven minutes from one minute after the start of the segment. With the weighting factor of 0.2 during EPG browsing, the ratio of the total viewed time length is 44% and the segment SEG2 is determined to be "not viewed" (determination "x"). The 20-minute segment SEG3 starting at 12:20 was watched only for eight minutes until the search request for related programs was generated. With the weighting factor of 1, the ratio of the total viewed time length is 40% and the segment SEG3 is determined to be "not viewed" (determination "x").

In this manner, in the second embodiment, the view determination is performed based on the view history generated by monitoring other operations in addition to channel selection operations. Even if a channel was selected, no search words are extracted from its segments determined to be "not viewed" (segments whose content was not grasped by the viewer such as during EPG browsing). Therefore, the viewer will not feel that proposed search words are inappropriate.

According to the above-described second embodiment, only by issuing a search request for related programs at any time, the viewer can search for programs using search words from segments determined to be "viewed" (segments whose content was grasped by the viewer).

Third Embodiment

The foregoing first and second embodiments have been described for the case where segments determined to be "viewed" in the view determination using the view history are identified. In a third embodiment, segments are identified depending on the presence or absence of the viewer's explicit indication. The explicit indication refers to the viewer's specific operation (hereafter referred to as a designated request), which may be pressing a particular button on the remote controller 3 or may be selecting and entering "Search for related programs later" via an operation screen such as a menu.

Figure 22:
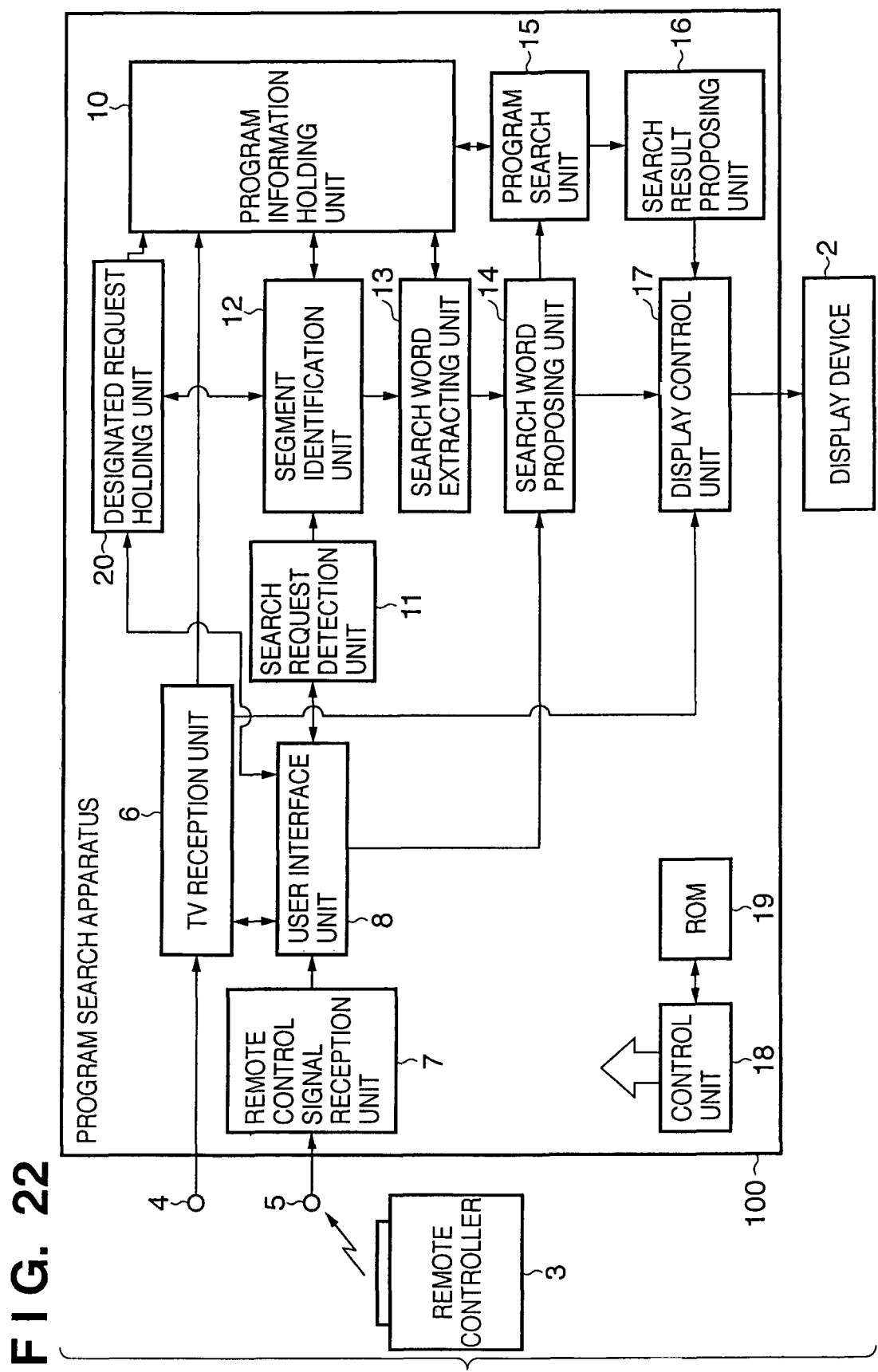
FIG. 22 is a block diagram showing the functional configuration of a program search apparatus applied as a third embodiment of the present invention.

FIG. 22 is a block diagram for contrast with FIG. 1, showing the general configuration of a program search apparatus 100 to which the third embodiment of the present invention is applied. With reference to FIG. 22, what is different from FIG. 1 is that the view determining unit 9 is replaced with a designated request holding unit 20. Elements having functions similar to those in the program search apparatus 1 shown in FIG. 1 are labeled with like reference numerals, and detailed description thereof will not be repeated here.

The designated request holding unit 20 holds a history of designated requests issued by the viewer. Detailed operations of the designated request holding unit 20 will be described later. The segment identification unit 12 identifies a segment at the time of generation of a search request for related programs based on the designated history in the designated request holding unit 20 and the supplement data in the program information holding unit 10. Detailed operations of the segment identification unit 12 will be described later.

By way of example, description will be given below of processing of the designated request holding unit 20 for holding the designated history based on designated requests issued by the viewer. Information treated as the designated history includes at least a value identifying a selected channel (e.g., the channel number or channel ID) and the time a designated request was generated. FIG. 23 shows an exemplary designated history. In FIG. 23, a designated request was issued at 12:08 on Dec. 12, 2005 while the channel 101 was selected (history No. 1). Further, designated requests were issued at 12:22 and 12:26 while the channel 101 was selected (history Nos. 2 and 3).

Figure 24:
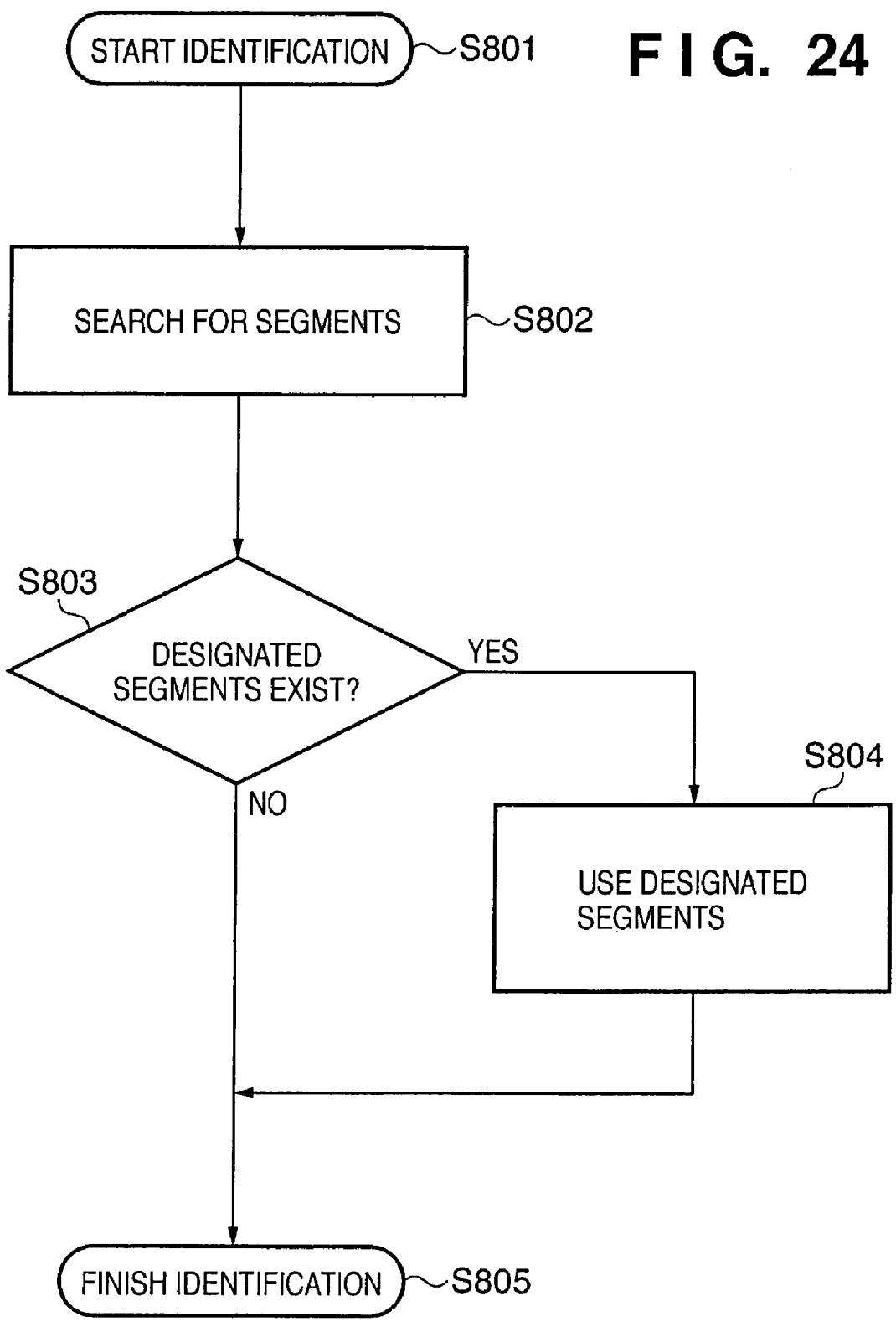
FIG. 24 is a flowchart describing processing operations of segment identification in the program search apparatus in the third embodiment of the present invention.

By way of example, description will be given below of processing of the segment identification unit 12 for identifying viewer-designated segments based on the designated history and the supplement data in the program information holding unit 10. FIG. 24 shows a process flow in the segment identification unit 12.

Figure 25:
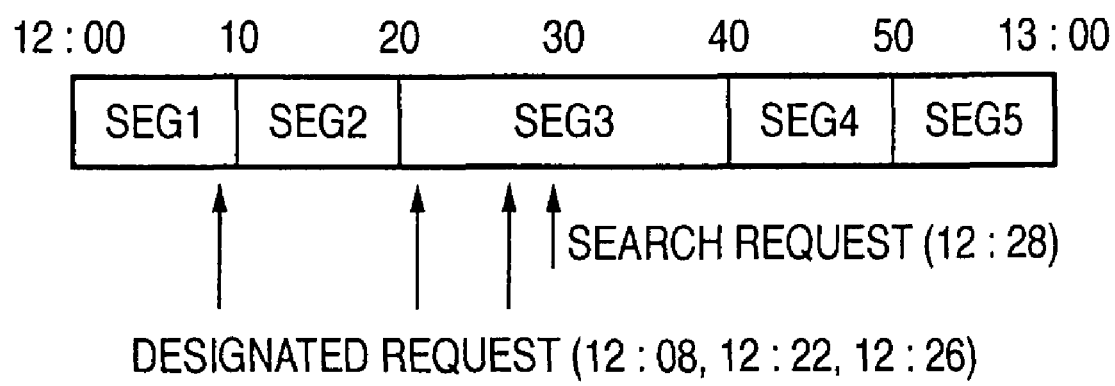
FIG. 25 is a diagram showing exemplary correspondence between the designated history and the segment structure in the program search apparatus in the third embodiment of the present invention.

Once notified of a search request for related programs by the search request detection unit 11, the segment identification unit 12 starts the processing in step S801. In step S802, the segment identification unit 12 searches for segment supplement data about designated segments based on the designated history held in the designated request holding unit 20 and the supplement data held in the program information holding unit 10. In step S803, the segment identification unit 12 determines whether or not the corresponding program has the designated segments. If the program has the designated segments, the process proceeds from step S803 to step S804, where the segment supplement data about these segments are set as supplement data from which search words are to be extracted. If the program does not have the designated segments, the process proceeds from step S803 to step S805 to finish the segment identification processing. FIG. 25 is a diagram showing the timing of designated requests and a search request where the search request for related programs is generated at 12:28 during viewing of the program A consisting of the five segments shown in FIG. 9. FIG. 25 corresponds to the designated history shown in FIG. 23. As a result of the segment search in step S802 of FIG. 24, the segment SEG1 is identified from the designated request generated at 12:08 (history No. 1). Further, the segment SEG3 is identified from the designated request generated at 12:22 (history No. 2) and the designated request generated at 12:26 (history No. 3).

The search word extracting unit 13 extracts search words from the segments SEG1 and SEG3 explicitly designated by the viewer. The case assumed here is that "the viewer wants to search for related programs but does not want the viewing to be disturbed by display of the related-program search screen or the search result screen." The viewer can designate segments by issuing a designated request and thereafter issue a search request at any time after the viewer comes to be able to permit the viewing to be disturbed by display of the related-program search screen or the search result screen.

According to the above-described third embodiment, by issuing designated requests and a search request for related programs at any time, the viewer can search for programs using search words extracted from segments explicitly designated by the viewer.

It is to be understood that the objects of the present invention may be accomplished by supplying a system or apparatus with a storage medium containing program code of software which implements the functions of the above-described embodiments, that is, by causing a computer (or CPU or MPU) of the system or apparatus to read out and execute the program code stored in the storage medium. In this case, the program code itself read out from the storage medium implements the functions of the above-described embodiments, and hence the storage medium containing the program code constitutes the present invention.

Examples of the storage medium that may be used for supplying the program code include a flexible disk, hard disk, optical disk, magneto optical disk, CD-ROM, CD-R, magnetic tape, nonvolatile memory card, and ROM. The functions of the above-described embodiments may also be implemented by causing the computer to execute the read-out program code.

Further, it is to be understood that the present invention covers the case where an OS (Operating System) or the like running on the computer performs part or all of actual processing under instructions of the program code to implement the functions of the above-described embodiments.

Further, it is to be understood that the present invention covers the case where after the program code read out from the recording medium is written to memory provided in a function extension board inserted into the computer or in a function extension unit connected to the computer, a CPU or the like provided in the function extension board or function extension unit performs part or all of actual processing under instructions of the program code to implement the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-127885, filed May 1, 2006 which is hereby incorporated by reference herein in its entirety.

What is claimed is:

1. A program search apparatus for searching for a broadcast program related to a viewed broadcast program, comprising:
   a broadcast receiving unit configured to receive a television broadcast signal;
   a program information memory configured to store program supplement data including channel information and broadcast time information for each program and segment supplement data about each of a plurality of segments in each program segmented along a timeline;
   an operation receiving unit configured to receive from a viewer a designation request for designating a segment, which is being viewed, as a segment to be used for searching for a program;
   a designation request holding unit configured to hold a history of the designation request for designating a segment, the history of the designation request including time information representing time at which the designation request made by the viewer was received by the operation receiving unit and channel information representing a broadcast channel which was being selected at said time;
   a search request detection unit configured to detect a search request from the viewer for searching for a program related to the designated segment, wherein the search request is made by the viewer separately from the designation request;
   a segment identification unit configured to identify, in response to the detection of the search request by the search request detection unit, the designated segment by matching the channel information and the time information included in the history of the designation request held in the designation request holding unit with channel information and broadcast time information corresponding to the segment supplement data stored in the program information memory for each of the plurality of segments;
   a search word extracting unit configured to extract, in response to the identification of the designated segment by the segment identification unit, a search word according to a predetermined extracting condition from the segment supplement data about the designated segment identified by the segment identification unit;
   a search word proposing unit configured to propose search words extracted by said search word extracting unit to cause a search word to be selected by the viewer out of the search words for use in searching for a program, wherein the search word proposing unit displays the search words by superimposing them on a video image of a program currently being watched; and
   a program search unit configured to search for a program related to the search word by using the search word selected from the proposed search words by the viewer and the program supplement data stored in said program information memory, wherein said search word extracting unit extracts, based on a predetermined extraction condition, a plurality of search words including, at least, a predetermined number of search words related to cast member name, segment title, and segment keyword, respectively, and if a number of search words that satisfy the predetermined extraction condition exceeds the predetermined number, said search word extracting unit narrows down the search words to be extracted by choosing more-frequently-used search words based on a number of times each search word has been used by the program search unit.

2. A method of controlling a program search apparatus for searching for a broadcast program related to a viewed broadcast program, comprising:

receiving a television broadcast signal;

holding program supplement data including channel information and broadcast time information for each program and segment supplement data about each of a plurality of segments in each program segmented along a timeline;

receiving from a viewer a designation request for designating a segment, which is being viewed, as a segment to be used for searching for a program;

holding a history of the designation request for designating a segment, the history of the designation request including time information representing time at which the designation request made by the viewer was received in said receiving step and channel information representing a broadcast channel which was being selected at said time;

detecting a search request from the viewer for searching for a program related to the designated segment, wherein the search request is made by the viewer separately from the designation request;

identifying, in response to the detection of the search request, the designated segment by matching the channel information and the time information included in the history of the designation request held in said step of holding a history with channel information and broadcast time information corresponding to the segment supplement data stored in said step of holding program supplement data for each of the plurality of segments;

extracting, in response to the identification of the designated segment in said identifying step, a search word according to a predetermined extracting condition from the segment supplement data about the designated segment identified in said identifying step;

proposing search words extracted in said extracting step to cause a search word to be selected by the viewer out of the search words for use in searching for a pro ram, wherein said proposing step displays the search words by superimposing them on a video image of a program currently being watched; and searching for a program related to the search word by using the search word selected from the proposed search words by the viewer and the program supplement data held in said program supplement data holding step, wherein said extracting step extracts, based on a predetermined extraction condition, a plurality of search words including, at least, a predetermined number of search words related to cast member name, segment title, and segment keyword, respectively, and if a number of search words that satisfy the predetermined extraction condition exceeds the predetermined number, said extracting step narrows down the search words to be extracted by choosing more-frequently-used search words based on a number of times each search word has been used in said searching step.

* * * * *